Aug. 25, 1970  R. T. FUJIOKA ET AL  3,525,538
FIFTH WHEEL
Filed March 28, 1968  5 Sheets-Sheet 1
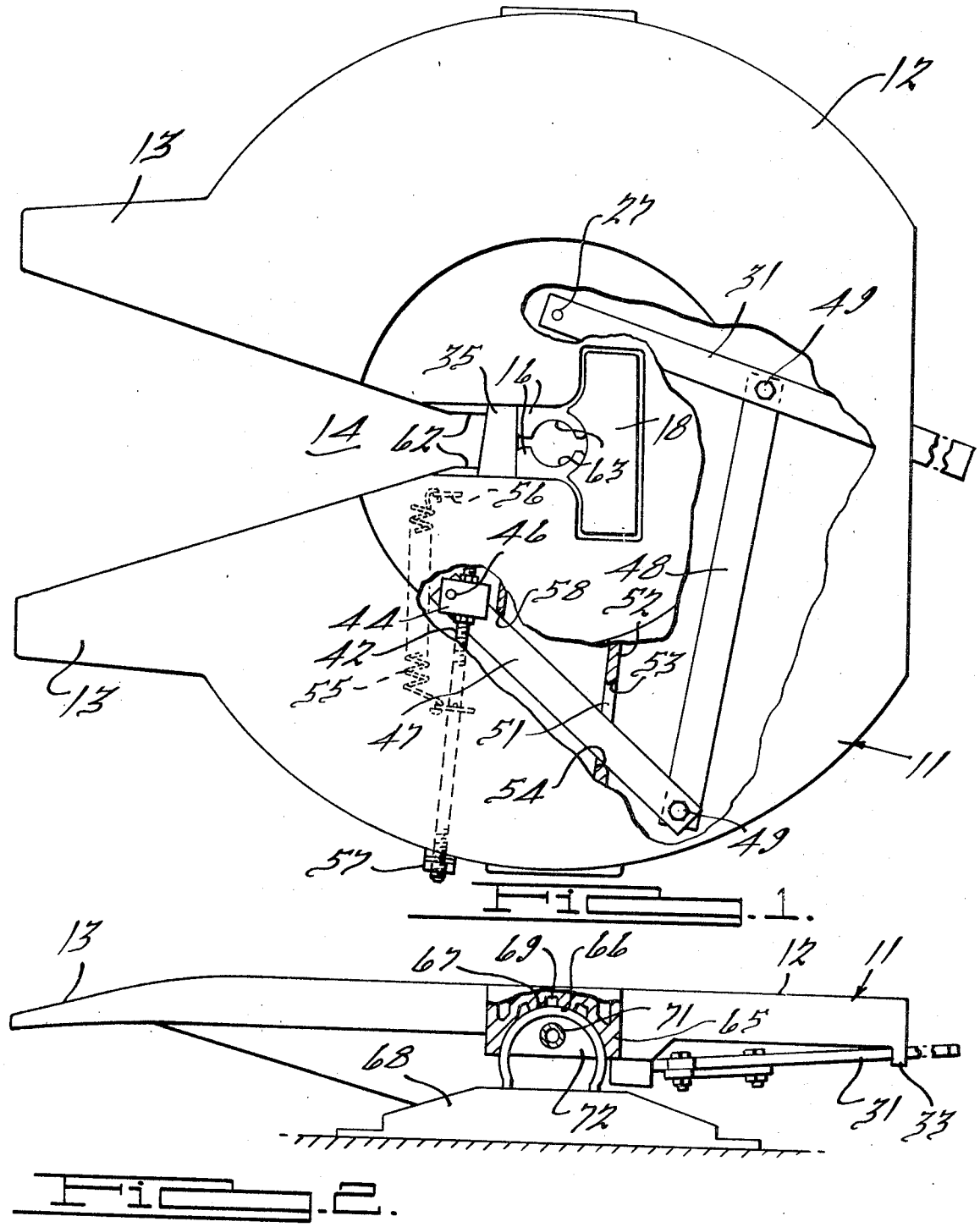
INVENTORS
Richard T. Fujioka
James G. Carr
BY
Harness, Dickey & Pierce
ATTORNEYS

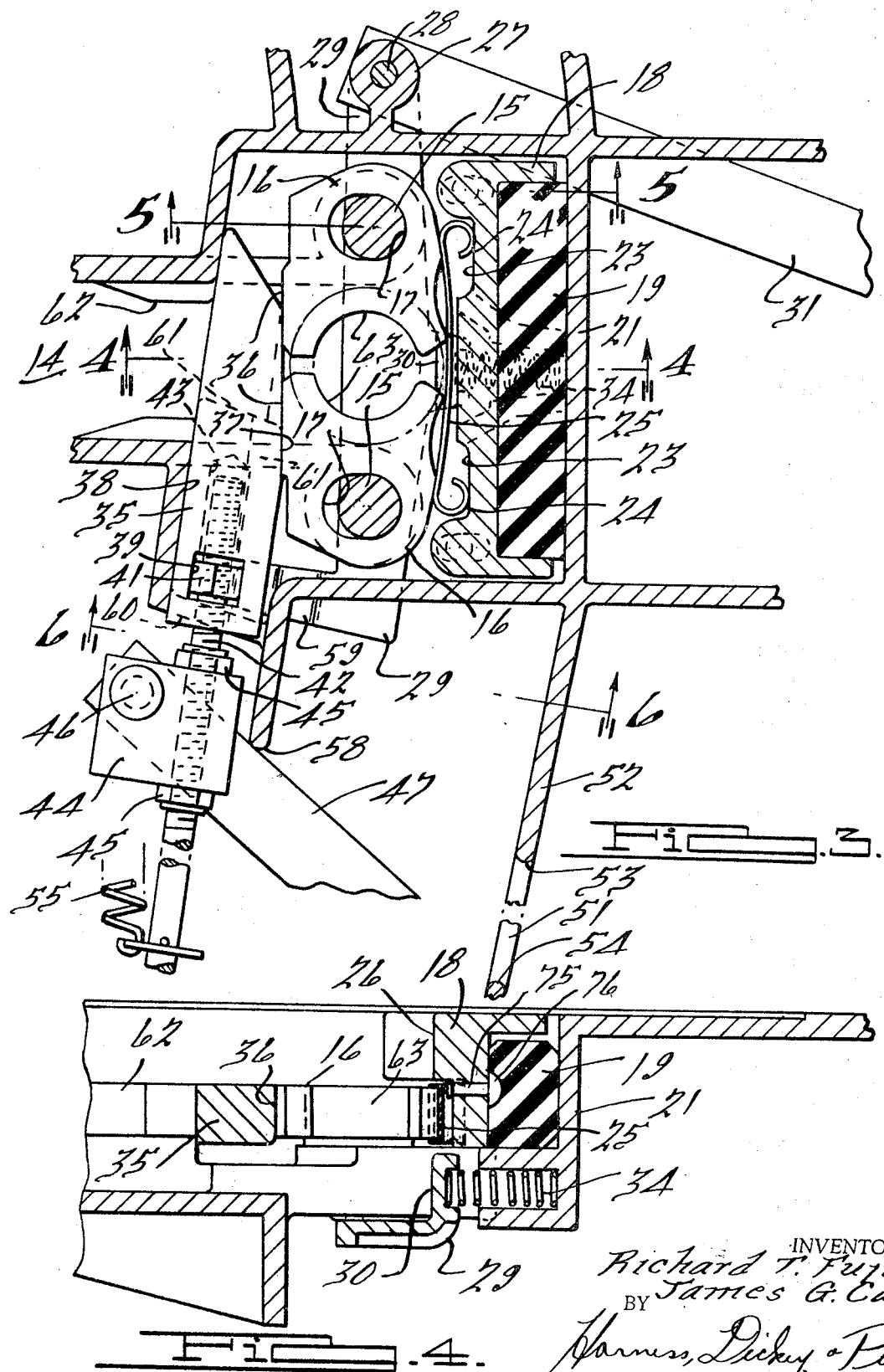

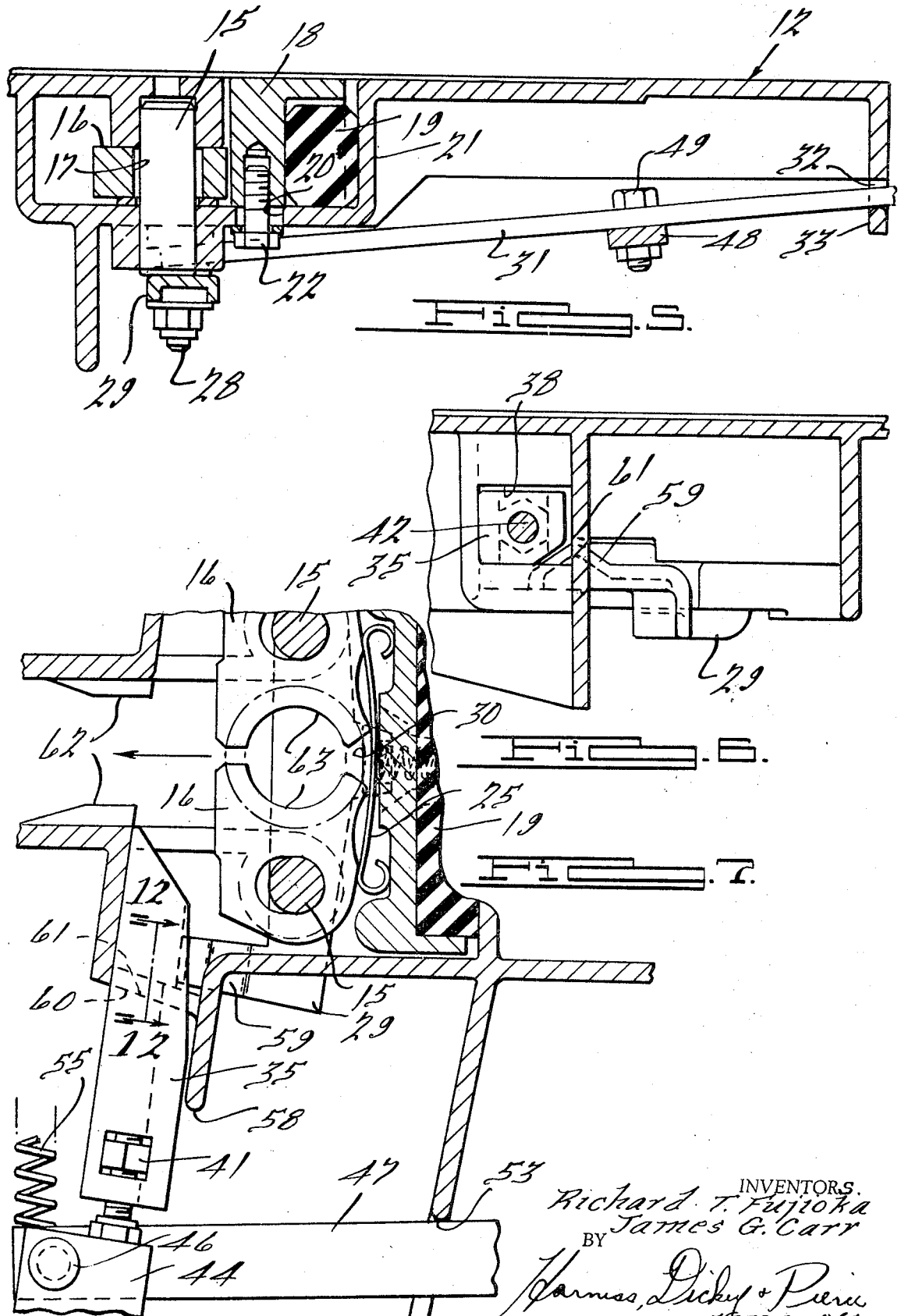

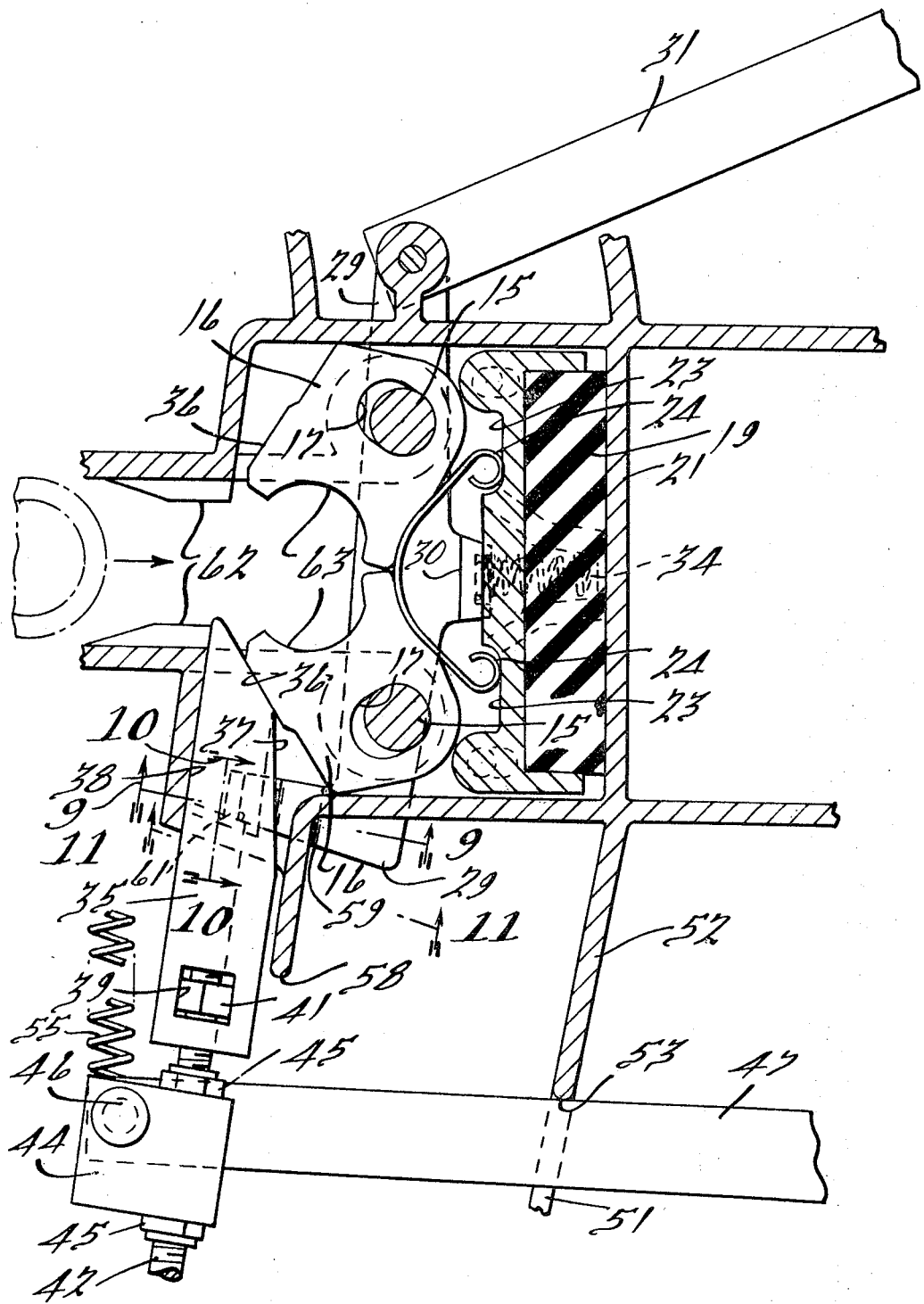

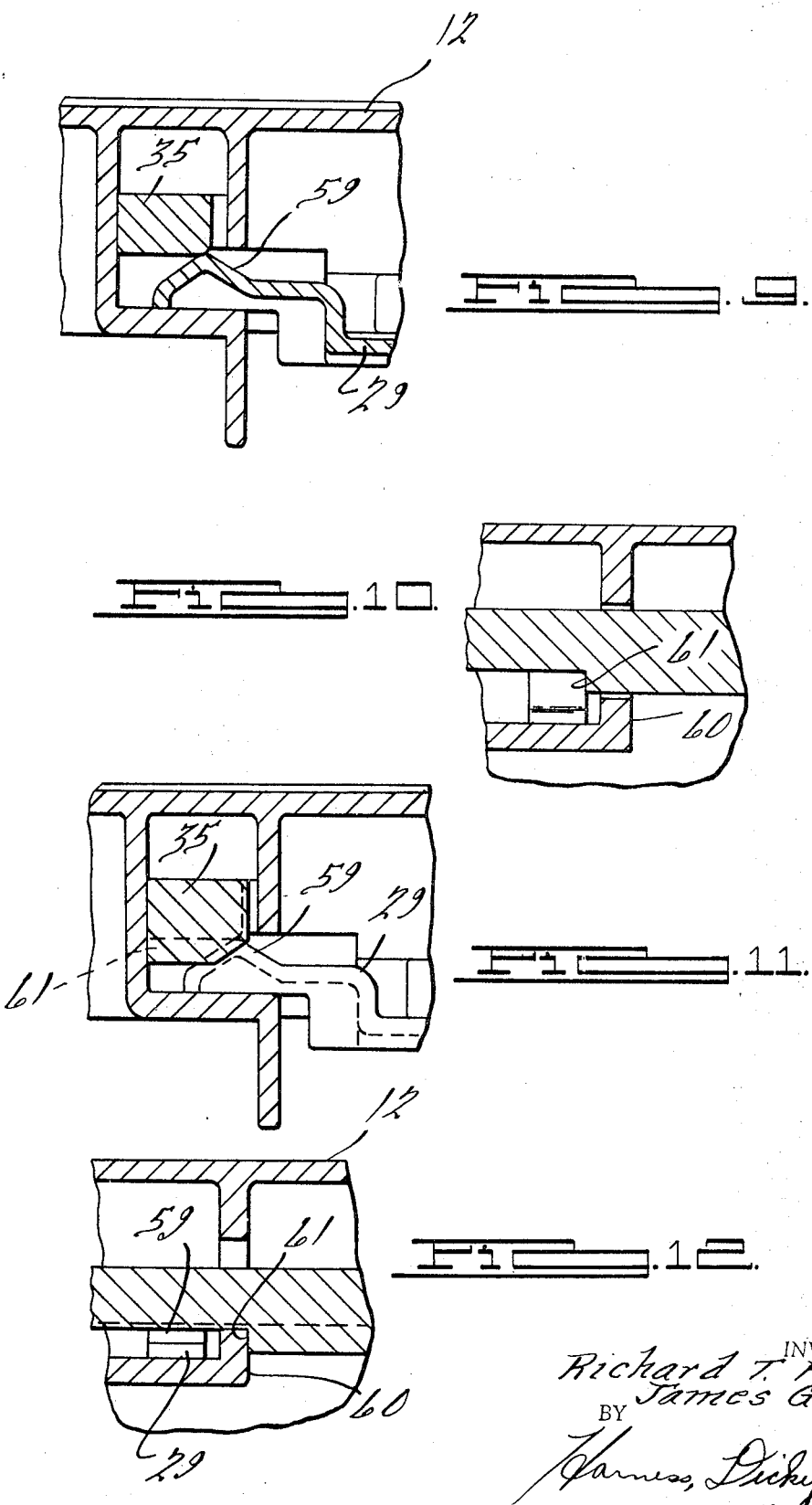

United States Patent Office 3,525,538
Patented Aug. 25, 1970

3,525,538
FIFTH WHEEL
Richard T. Fujioka, Oxford, and James G. Carr, Bloomfield Hills, Mich., assignors to Fruehauf Corporation, Detroit, Mich., a corporation of Michigan
Filed Mar. 28, 1968, Ser. No. 716,769
Int. Cl. B62d 53/12
U.S. Cl. 280—434                                    11 Claims

ABSTRACT OF THE DISCLOSURE

A platform having a throat for receiving a kingpin having a reduced central portion which is engaged by a pair of pivoted jaws which close when the kingpin is properly positioned. A wedge locks the jaws in closed position under the pressure of a spring and is positively retained when withdrawn. The wedge is released from its positively retained position and is releasably retained by a trigger when the kingpin moves from the jaw. The wedge is released by the trigger to lock the jaws upon the movement of the kingpin thereinto.

CROSS-REFERENCE TO RELATED APPLICATION

In the application of R. V. Mathers et al., filed Aug. 20, 1968, Ser. No. 755,251, for "Fifth Wheel," and assigned to the assignee of the present invention, a somewhat similar fifth wheel as that of the present invention is illustrated, described and claimed which is believed to be an improvement over the present disclosed structure.

BACKGROUND OF THE INVENTION

Reference may be had to Pat. No. 3,251,610 to Eugene Chosy issued May 17, 1966, for Fifth Wheel which was assigned to the assignee of the present invention.

SUMMARY OF THE INVENTION

The fifth wheel of the present invention pertains to a casting in the nature of a platform having an entrance throat for the kingpin, the casting being mounted on a pair of aligned supports for tilting movement. The casting supports a pair of pivoted jaws having facing arcuate recesses which encompass the kingpin at a small central portion located between larger end portions thereof. A leaf spring urges the jaws to open position, the jaws having slots which permit back and forth movement as well as the pivotal movement. A plate is provided rearwardly of the jaws which compresses a hard elastomeric block when an arcuate portion is engaged by a large portion of the kingpin for absorbing shock and vibration. A projecting boss engages the elastomeric block to provide a preload which with the leaf spring bears against the jaws and plate to maintain the jaws in tight engagement with the kingpin even though it is worn and to substantially reduce the continuous wear thereof. The outer faces of the jaws have plain surfaces which are engaged by a plain surface of a wedge which is advanced when the jaws are engaged by the kingpin for locking the jaws in closed position. The wedge is loosely supported on one end of a rod the opposite end of which extends through a flange at the side of the platform and is urged toward locking position by a spring in engagement with the rod. A lever system is provided which has mechanical advantage when initially withdrawing the wedge from locked position, until a shoulder on the wedge engages a wall of the platform. A cam boss on the end of a trigger releases the wedge and the shoulder thereof is engaged by the cam boss to maintain the wedge in releasable retracted position each time the kingpin moves from the jaws. When the kingpin is properly inserted within the jaws they move into engagement with the central smaller diameter portion thereof. When the trigger is engaged by the kingpin near the end of its movement the wedge is released to permit the spring engaging the rod to move the wedge into locking position. A nut on the outer end of the rod is adjusted to limit the advancement of the wedge and to visually indicate the failure of the wedge to advance and completely lock the jaws.

BRIEF DESCRIPTION OF THE DRAWINGS

FIG. 1 is a broken plan view of a fifth wheel embodying features of the present invention;

FIG. 2 is a broken side view of the structure illustrated in FIG. 1;

FIG. 3 is a broken sectional view of a central portion of the structure illustrated in FIG. 1, taken in a plane parallel to the top thereof, showing the wedge in jaw securing position;

FIG. 4 is a sectional view of the structure illustrated in FIG. 3, taken on the line 4—4 thereof;

FIG. 5 is a sectional view of the structure illustrated in FIG. 3, taken on the line 5—5 thereof;

FIG. 6 is a sectional view of the structure illustrated in FIG. 3, taken on the line 6—6 thereof;

FIG. 7 is a view of the structure illustrated in FIG. 3, showing the wedge in retracted position with the kingpin locked between the jaws;

FIG. 8 is a view of the structure illustrated in FIG. 3, with the jaws in open position and the wedge retained by a releasable trigger;

FIG. 9 is a sectional view of the structure illustrated in FIG. 8, taken on the line 9—9 thereof;

FIG. 10 is a sectional view of the structure illustrated in FIG. 8, taken on the line 10—10 thereof;

FIG. 11 is a sectional view of the structure illustrated in FIG. 8, taken on the line 11—11 thereof, and FIG. 12 is a sectional view of the structure illustrated in FIG. 7, taken on the line 12—12 thereof.

DESCRIPTION OF THE PREFERRED EMBODIMENT

The fifth wheel 11 has a platform 12 which is made from cast material having reinforcing and element-supporting flanges extending downwardly therefrom. The rearward portion of the platform 12 has upwardly sloping spaced ends 13 providing a throat 14 for receiving and aligning a kingpin centrally of the platform. The central part of the platform 12 supports a pair of spaced pins 15 which project through apertures 17 in a pair of jaws 16. The apertures 17 of the jaws may be elongated to permit the fore and aft bodily movement of the jaws on the pins.

A casting 18 confines a hard, elastomeric block 19 within an extension 21 of the platform 12 and is secured for limited movement by a pair of screws 22 which operate in slots 20 in the extension 21. The casting portion 18 has recesses 23 for receiving curled ends 24 of a bowed leaf spring 25 which is in engagement with the rear side of the jaws 16 for urging the jaws outwardly to open position, as illustrated in FIG. 8. A forward central portion 26 of the casting 18 is in position to be engaged by the top enlarged portion of the kingpin which moves the casting 18 toward the block 19 to take up shock and minimize damage to the kingpin and jaws.

A boss 27 on the casting has a bolt 28 extending therethrough for supporting a link or trigger 29 and a lever 31, as illustrated in FIG. 3. The boss 27 has an angular face at the bottom to permit the lever 31 to be disposed at an angle so that its outer end may pass through an elongated slot 32 in a flange 33 at the side of the platform 12, as illustrated in FIG. 5. It will be noted that the pins 15 rest on the link or trigger 29 and are retained in position thereby.

As illustrated in FIGS. 3, 4 and 8, a coil spring 34 in the extension 21 engages a finger 30 on the link or trigger 29 and urges a cam boss 59 on the outer end toward the throat in the path of movement of a wedge 35 when not engaged by the kingpin. The jaws 16 have planar surfaces 36 on their forward faces which are engaged by a face 37 on the wedge 35 when moved forwardly into locked position through a tunnel 38 in the casting 18. The wedge has a through aperture 39 at the rear end containing a nut 41 into which an end of a rod 42 is threaded to extend into an enlarged aperture 43 in the wedge which is freely movable on the rod. The rod has a plate 44 threaded thereon and secured in an adjusted position by a pair of nuts 45. The rod 42 extends through the flange 33 about the edge of the platform 12 and has a nut 57 adjustedly secured thereon for limiting the closing movement of the wedge 35.

The plate 44 is secured by a pivot 46 to a link 47 which is connected by a link 48 to the lever 31 by pivots 49. The link 47 extends through an aperture 51 in a flange 52 of the platform 12 providing a fulcrum point 53 engaged by the link 47 when retracting the wedge 35 to provide a short moment arm. A fulcrum 54 on the opposite side of the aperture is engaged by the link 47 when the wedge is moved to locked position. A spring 55 has one end secured to the rod 42 and the other end secured to a boss 56 on the platform 12, urges the rod 42 and wedge 35 to locked position. It will be noted in this arrangement that the initial opening movement of the wedge 35 by the withdrawal of the rod 42 permits the nut 41 to strike the outer end of the aperture 39 and produce an impact force thereto for initially breaking the engagement between the surfaces 36 of the jaws and face 37 of the wedge.

The link 47 engages an edge 58 of a flange on the platform 12 which forms a fulcrum point for initially providing a maximum force for moving the wedge from locked position. Thereafter, the link 47 will engage the fulcrum point 53 for increasing the lever arm and producing a fast retraction of the wedge 35 against the tension of the spring 55. When in retracted position, a shoulder 61 on the wedge 35, which is free to drop down due to its free connection on the rod 42, engages a face 60 on the platform 12 to retain the wedge in retracted position, as illustrated in FIG. 12. The kingpin engages the finger 30 and retains the link or trigger 29 in retracted position. When the kingpin is withdrawn from the jaws the finger 30 is released and the spring 34 advances the cam boss 59 into engagement with the wedge 35, as illustrated in FIG. 9. This raises the wedge and moves it from engagement with the face 60 permitting it to be advanced by the spring 55. The advancement is immediately interrupted by the engagement of the shoulder 61 with the cam boss 59 which secures the wedge in releasable retained position, as illustrated in FIGS. 8, 10 and 11. When the tractor is to be connected to the trailer the movement of the kingpin into the jaws 16 will close the jaws thereabout and near the end of the movement, the kingpin will strike the finger 30 and retract the link or trigger 29 moving the cam boss 59 from engagement with the shoulder 61 to permit the wedge to be moved to jaw locked position by the spring 55, as illustrated in FIG. 3.

Guide flanges 62 at the inner end of the throat 14 check the kingpin to ascertain whether it is central and at a proper height to enter into the recesses of the jaws 16. The kingpin will be prevented from entering the jaws if it is too high or will be deflected downwardly by the guide flanges 62 so as to be properly oriented in height to enter the jaws 16. When the jaws 16 are in open position, as illustrated in FIG. 8 with the wedge retracted and releasably retained in position by the cam boss 59, the entrance of the kingpin in the throat 14 will be checked by the guide flanges 62 so as to be centered and properly located in height. As the kingpin enters the jaws 16, they will be rotated to have the circular recesses 63 engage the central part of the kingpin at the point of smallest diameter. The top portion of the kingpin of larger diameter will abut the plate 18 and compress the elastomeric block 19 to reduce the shock of engagement while the lower larger portion of the kingpin will strike the finger 30 of the link or trigger 29 and pivot it about the bolt 28 to withdraw the cam boss 59. This permits the spring 55 to move the lever 31 and cause the link 47 to pivot about the fulcrum point 54 and advance the wedge 35 into locking position, as illustrated in FIG. 3, limited in advancement by the nut 57 on the rod 42, as illustrated in FIG. 1. Should the wedge be prevented from moving inwardly the full amount, the nut 57 will project outwardly of the flange 33 to indicate that a proper engagement of the jaws 16 with the kingpin did not occur. The wedge locks the jaws 16 in kingpin engaged position backed by the leaf spring 25 and the plate 18. Any movement of the kingpin relative to the jaws will be taken up by the leaf spring 25 and the compressible block 19 to reduce wear due to shock and vibration.

The platform 12 has bosses 65 which have semicylindrical bearing surface 66 disposed in engagement with arcuate surface 67 extending upwardly from supporting feet 68. The surface 66 is broken by recesses 69 in which a lubricant is collected. A pin 71 extending through side flanges 72 of the bosses 65 retains the feet 68 in position on opposite sides of the platform 12 with the arcuate surfaces 66 and 67 in engagement with each other.

As illustrated in FIG. 4, the casting 18 has a headed rivet secured thereto with a head 76 in position to engage the elastomeric block 19 for the purpose of preloading the block 19 when the casting 18 is engaged by the kingpin for producing a preload up to approximately 1,000 pounds. This stabilizes the kingpin and assists maintaining it in tight engagement with the jaws 16. When a shock load occurs, up to substantially 10,000 pounds will be taken up by the confined elastomeric block 19 to relieve the parts of the fifth wheel from any damage resulting therefrom.

We claim:

1. In a fifth wheel, a platform having a throat for the reception of the kingpin, pivotal supports for said platform, a pair of side jaws pivoted on said platform aligned with said throat and having facing recesses when in closed position, a wedge movable across the outer face of the jaws when in closed position, a rod on said wedge having its outer end extending through an aperture in a flange of the platform, a spring engaging said rod for moving said wedge to locking position, lever means for retracting said wedge, means for retaining said wedge in retracted position, a spring pressed trigger means having a finger located between said side jaws in position to be released by the kingpin when moving from the side jaws, and a cam boss on the trigger means for releasing said wedge and engaging and retaining it is releasable retracted position.

2. In a fifth wheel as recited in claim 1, wherein said finger is engaged by the kingpin rear the end of its movement into the side jaws for retracting said trigger means and cam boss for releasing the wedge from its releasable retracted position.

3. In a fifth wheel as recited in claim 1, wherein said lever means is pivoted to said rod on which the wedge is loosely mounted, and fulcrum means adjacent to said lever means and engageable thereby for changing the lever arm thereof as the wedge is withdrawn to retracted position to substantially reduce the initially and subsequent applied force required for withdrawing the wedge.

4. In a fifth wheel as recited in claim 1, wherein the kingpin is resiliently biased by different elements at the top and bottom portions and at the reduced portion therebetween when clamped in said side jaws.

5. In a fifth wheel as recited in claim 3, wherein the lever means comprises a first lever pivoted to the platform, a second lever pivoted to the rod of the wedge, said second lever engaging said fulcrum means, and a link interconnecting said levers.

6. In a fifth wheel as recited in claim 5, wherein a projection on said platform is engaged by said lever means when the wedge is released for providing a stop point about which the lever means pivots when the wedge is advanced to locked position.

7. In a fifth wheel as recited in claim 1, wherein the wedge is secured to the rod in a manner to provide free movement therebetween, and wherein said wedge has a shoulder which engages a wall of the platform when in retracted position, and a cam boss on said trigger means which releases said wedge from its retracted position and immediately engages the shoulder thereafter to retain the wedge in releasable retracted position when the kingpin actuates the trigger means upon its movement from the side jaws.

8. In a fifth wheel as recited in claim 7, wherein said trigger means is actuated by the kingpin upon its movement into the jaws to move the cam boss from engagement with the shoulder and permit the wedge to advance into engagement with the side jaws.

9. In a fifth wheel as recited in claim 1, wherein an adjustable head is provided on the outer end of the rod which limits the forward movement of the wedge and provides indication of improper seating of the wedge in locking position when the head extends outwardly of the flange.

10. In a fifth wheel as recited in claim 1, wherein the mouth of the throat is provided with a cam element which blocks the kingpin against entry into the throat when the kingpin is at too great a height to be received by said side jaws.

11. A fifth wheel in accordance with claim 10, wherein said cam elements cam the kingpin downwardly upon engagement therewith.

References Cited
UNITED STATES PATENTS

| | | | |
|---|---|---|---|
| 1,592,832 | 7/1926 | La Londe | 280—434 |
| 2,756,074 | 7/1956 | Kayler | 280—440 X |
| 2,788,989 | 4/1957 | Davies | 280—434 |
| 3,251,610 | 5/1966 | Chosy | 280—435 |

LEO FRIAGLIA, Primary Examiner

U.S. Cl. X.R.

280—440